United States Patent
Fauroux et al.

(10) Patent No.: US 8,978,792 B2
(45) Date of Patent: Mar. 17, 2015

(54) ROBOT FOR CLIMBING POSTS

(75) Inventors: Jean-Christophe Fauroux, Mazayes (FR); Joël Morillon, Magny les Hameaux (FR); Frédéric Le Gusquet, Elancourt (FR); Frédéric Guiet, Valence (FR); Maxime Vienne, Clermont-Ferrand (FR)

(73) Assignees: Thales, Courbevoie (FR); Institut Francais de Mecanique Avancee, Aubiere (FR)

( * ) Notice: Subject to any disclaimer, the term of this patent is extended or adjusted under 35 U.S.C. 154(b) by 917 days.

(21) Appl. No.: 12/935,159

(22) PCT Filed: Mar. 27, 2009

(86) PCT No.: PCT/EP2009/053663
§ 371 (c)(1),
(2), (4) Date: Dec. 1, 2010

(87) PCT Pub. No.: WO2009/118409
PCT Pub. Date: Oct. 1, 2009

(65) Prior Publication Data
US 2011/0100734 A1 May 5, 2011

(30) Foreign Application Priority Data
Mar. 28, 2008 (FR) ..................... 08 01713

(51) Int. Cl.
*B62D 57/024* (2006.01)
*A63B 27/00* (2006.01)

(52) U.S. Cl.
CPC .............. *B62D 57/024* (2013.01); *A63B 27/00* (2013.01)

USPC ............................................ 180/8.1

(58) Field of Classification Search
USPC .................................... 180/8.1, 8.7
See application file for complete search history.

(56) References Cited

U.S. PATENT DOCUMENTS

| 2,009,474 | A | | 7/1935 | Castelli |
| 2,477,922 | A | * | 8/1949 | Emery et al. .............. 144/208.8 |
| 2,581,479 | A | | 1/1952 | Grasham |
| 2,854,293 | A | | 9/1958 | Riblet |
| 3,460,649 | A | | 8/1969 | Baker et al. |
| 3,485,320 | A | | 12/1969 | Jones |
| 3,811,320 | A | | 5/1974 | Cowell |
| 3,856,111 | A | | 12/1974 | Baker |
| 3,955,645 | A | | 5/1976 | Dye |

(Continued)

FOREIGN PATENT DOCUMENTS

| CA | 2 192 757 A1 | 6/1997 |
| WO | 8000794 | 5/1980 |

(Continued)

*Primary Examiner* — Joseph Rocca
*Assistant Examiner* — Felicia L Brittman
(74) *Attorney, Agent, or Firm* — Baker Hostetler LLP

(57) ABSTRACT

A climbing robot that can move along a post having a vertical axis comprises a frame fitted with motorized movement assembly for moving along the post and with a module for controlling and commanding the motorized movement assembly. The motorized movement assembly comprises a bracing structure wherein the center of gravity is at a distance from the axis of the post and which comprise at least two rolling contact elements designed to be in contact with the post, including at least one motorized rolling contact element called the propulsion contact element.

19 Claims, 5 Drawing Sheets

(56) References Cited

U.S. PATENT DOCUMENTS

| | | | |
|---|---|---|---|
| 3,960,240 A | 6/1976 | Cotton | |
| 3,991,853 A | 11/1976 | Bridges | |
| 4,331,216 A | 5/1982 | Amacker | |
| 4,637,494 A | 1/1987 | Iida et al. | |
| 4,738,583 A | 4/1988 | Macconochie et al. | |
| 5,213,172 A * | 5/1993 | Paris | 180/8.1 |
| 5,542,496 A * | 8/1996 | St. Denis | 182/133 |
| 5,551,525 A | 9/1996 | Pack et al. | |
| 5,680,910 A * | 10/1997 | Sarphie, IV | 182/135 |
| 5,987,364 A | 11/1999 | Le Gusquet et al. | |
| 6,793,026 B1 | 9/2004 | De Fazio | |
| 7,086,502 B2 | 8/2006 | Yim et al. | |
| 7,399,258 B1 * | 7/2008 | Sugar et al. | 482/54 |
| 2003/0188416 A1 * | 10/2003 | Spittle et al. | 29/428 |

FOREIGN PATENT DOCUMENTS

| | | |
|---|---|---|
| WO | 92/04269 A1 | 3/1992 |
| WO | 2008/076193 A2 | 6/2008 |

* cited by examiner

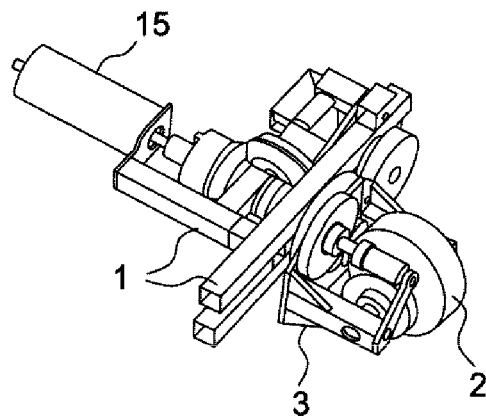
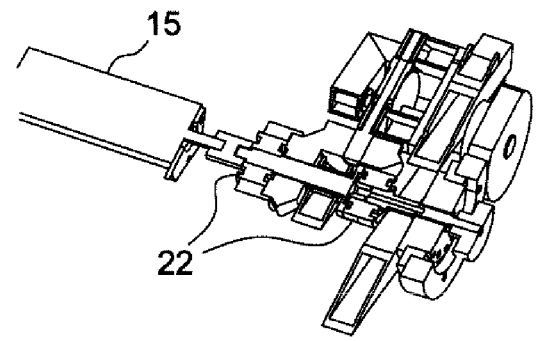
FIG.4a  FIG.4b
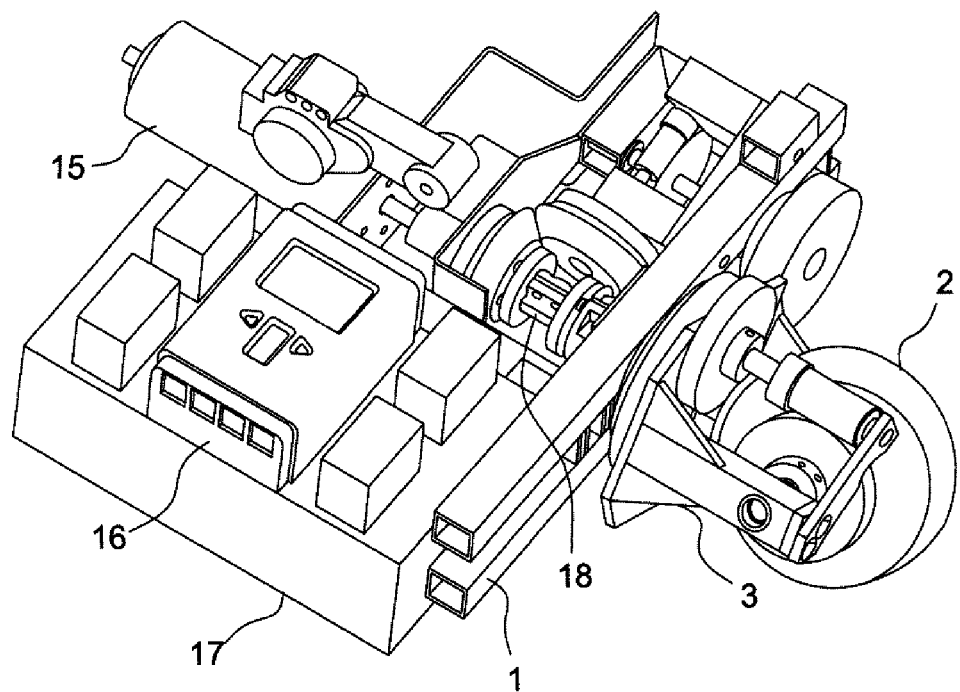
FIG.5

_US 8,978,792 B2_

ROBOT FOR CLIMBING POSTS

CROSS-REFERENCE TO RELATED APPLICATIONS

This application is a National Stage of International patent application PCT/EP2009/053663, filed on Mar. 27 2009, which claims priority to foreign French patent application No. FR 08 01713, filed on Mar. 28, 2008, the disclosures of which are incorporated by reference in their entirety.

FIELD OF THE INVENTION

The invention applies to the field of safety of property and people and contributes most particularly to civil "crisis management" (natural catastrophe; chemical, biological or radiological contamination; riots) and/or military "crisis management" (actions for keeping the peace, securing perimeters, controlling areas, etc.). In particular it relates to the structured (urban or rural) environments but may apply to natural spaces.

BACKGROUND

The effectiveness of management of such contexts lies essentially in an assessment of the situation that is at the same time rapid, reliable and permanent. This involves gathering all the data necessary to characterize it in terms of criticalness (what is the level of seriousness?), of space (what is the extent of the crisis?) and of time (how will the situation evolve?). In centralized crisis management, which is the most frequent case, all of these data must then be conveyed to the central station coordinating the actions on the ground.

The nature of the data to be acquired to construct and keep up-to-date a good representation of the situation depends on the nature of the crisis in question: visual observation, direct observation when possible without risk or else observation by means of remote cameras, clearly constitutes a preferred source of information. The means used must however be compatible with the context (perception of day and/or night, need for multiple viewpoints, presence of contamination, discretion, etc.) and are not necessarily sufficient to grasp all the dimensions of the crisis.

Therefore, in addition to solely the direct or remote view, dedicated sensors are often required to enhance the knowledge of the situation; it is possible in particular to consider acoustic sensors (microphones), nuclear, chemical, biological or radiological contamination sensors, sensors of temperature and for detecting movements and even GPS location modules.

There is therefore a serious need for adaptability and modularity in the perception equipment to be used in order to gather the most complete information possible.

The capability to gather simultaneously data over the whole area concerned, through a more or less dense network of complementary sensors, constitutes another factor in the success of crisis management. It is therefore necessary to have means allowing an appropriate positioning and a rapid deployment of these multiple items of equipment, which will allow a permanence (endurance) of maximum operation.

The quality and richness of the data delivered by the majority of sensors in question depend greatly on their placement in the field. Positioning high up makes it possible to extend the range of perception, in particular for the observation sensors (cameras) which constitute one of the main sources of information, and makes it possible to avoid obstacles specific to the urban environment, a context of preferred application of the present invention.

Finally, the gathering of information spread over the crisis area must be accompanied by appropriate communication means making it possible to convey the data to the centralized management station. The existing infrastructures (telephone networks, internet network, etc.) can satisfy a portion of the need, for example between a "sensor network communication node" and the centralized management station; on the other hand, it is still necessary to put in place the individual (radio) transmissions between the sensors and this "communication node" by seeking to avoid as much as possible the radio transmission problems specific to the urban environment (concealing elements and masking elements, interfering reflections, etc.). A capability for rapid positioning of antennas and/or of communication relays on high points of the urban environment is necessary to the credibility of a distributed information gathering apparatus, with accelerated deployment. This capability may be combined with the capability already allowing the various sensors to be deployed high up.

A first solution consists in manually installing the sensors in question. But manual installation of the sensors does not make it possible to easily take advantage of positioning high up. The use of ladders, lift trucks or of any other equivalent means requires considerable logistics; the necessary means are not always immediately available and their use always requires considerable delays incompatible with the speed of reaction usually sought in a crisis situation. Moreover, the discretion required by certain uses (police, military) also suffers when use is made of heavy deployment means.

SUMMARY OF THE INVENTION

Certain sites that are considered sensitive can be pre-fitted with permanent means making it possible to monitor the sites permanently. This second solution is in fact already used for sites such as, for example, public places conducive to attacks or to disorderly conduct (monitoring of public transport, crowd control in stadia) or else industrial areas at risk. It is not however possible to envisage fitting all the sites that are potentially involved in a crisis situation, both for economic reasons and because of the, by definition, unforeseeable character of the crisis (for example, monitoring of certain sensitive housing estates by the police force).

Currently there are various electromechanical devices capable of moving on vertical supports with 1 degree of freedom (of the ladder or post type) or 2 degrees of freedom (of the wall type).

Robots are known that are capable of moving along a wall by means of suckers (as described in U.S. Pat. No. 5,551,525), of electromagnets (as described in U.S. Pat. No. 3,811,320) and/or of buried spikes.

U.S. Pat. No. 5,213,172 describes a system capable of transporting tools vertically along structures of the "high-voltage pylon" type with a trellis structure. The gripping mechanism proposed is however specifically dedicated to this type of support and consumes energy. Owing to its principle and its alternating function, this system involves great complexity and requires a large number of sensors to ensure the judicial positioning of the grippers between the nodes of the trellis structure.

The "climbing robot" proposed in U.S. Pat. No. 5,542,496 is initially intended to climb metal pipes and posts for the purposes of sanding and/or painting. The variation in the diameter of the conical post to be climbed is taken into account with a pneumatic, heavy, costly and high energy-consuming presser device. The latter furthermore requires a complex pressure regulation loop in order to ensure that the robot does not slide. Moreover, this device clutches the post over the whole of its circumference, which does not seem compatible with the presence of possible obstacles.

Several robots for pruning trees use the principle of a ring centered on the trunk by several peripheral rollers kept pressed by high pressure; they are described in U.S. Pat. Nos. 2,581,479, 2,477,922, 2,482,392. They all require completely clutching the trunk and comprise regulated, complex and cumbersome clamping mechanisms.

There are also devices using a static bracing mechanism making it possible to attach a platform sticking out from a post or in a tree; an example is proposed in patent U.S. Pat. No. 3,460,649. Most of these systems also allow the tree to be ascended by jerky, violent movements that consume energy and are entirely manual; as examples, it is possible to cite the systems of U.S. Pat. Nos. 4,331,216, 3,960,240, 3,955,645.

Consequently, there remains today a need for a system capable of climbing along a post (such as a lamp post, a tree trunk, a gutter, etc.), fitted with means for performing a surveillance mission for example, notably in an urban environment, and simultaneously satisfying all of the aforementioned requirements, namely reduced bulk and lightness, operational endurance, low energy consumption, easy, rapid and discrete installation, autonomy and speed of movement along the post, capability of orientation about the post, ability to avoid possible obstacles tangential to the post.

The climbing robot according to the invention is a robot fitted with movement means, various sensors, a standalone energy source and a transceiver for transmitting the captured information to a central monitoring station (PC) and for receiving from the PC the settings for controlling the sensors and the movement means.

"Climbing robot" means a robot capable of climbing along a post and coming back down again.

The energy consumption is greatly reduced compared with the systems of the prior art because staying in position on the post is achieved without energy consumption by the bracing principle. Only the ascent (or descent) of the robot consumes energy.

More precisely, the subject of the invention is a climbing robot that can move along a post having a vertical axis Oz, which comprises a frame fitted with motorized means for moving along the post and with a module for controlling and commanding these movement means. It is characterized in that the motorized movement means comprise bracing means of which the center of gravity G is at a distance from the axis Oz of the post and which comprise at least two rolling contact elements designed to be in contact with the post, including at least one motorized rolling contact element called the propulsion contact element and having a friction contact with the post, the distance from G, the coefficient of friction of the propulsion contact element and the inclination of the robot relative to the axis Oz being linked together so as to ensure that the robot is kept in a fixed position without consumption of energy.

This gives an electromechanical device making it possible to improve the effectiveness of crisis management in a structured environment. Its advantages are:
- a capability to carry modular and easily interchangeable payloads, of various kinds (cameras, CBRN—the acronym for chemical, biological, radiological, nuclear— sensors, radio transmission and relaying means, antennas, GPS location modules),
- a capability of rapidly positioning the carried payloads on various vertical supports of the urban environment in order to expand their performance via a use of "elevated positions",
- reduced weight and dimensions for rapid deployment by a single user, without additional logistics and without complex preparation (including in terms of declarations or authorizations),
- an extensive and simultaneous spatial coverage of the data collection (by the use of several climbing robots capable of being fitted with complementary sensors),
- a permanence over time of data collection: once in position, the climbing robot no longer consumes energy which then becomes entirely available for the payload; positioning on "outdoor elevated points" associated with the low consumption of the sensors in question makes it possible to envisage solar sensors for powering the central unit for an indefinite period.

None of the current competitive solutions simultaneously offers all of these capabilities.

Preferably, for reasons of simplicity of the mechanical transmission, the motorized rolling contact element(s) is (are) the rolling contact element(s) closest to the center of gravity G.

In order to prevent any imbalance of the contact forces of the post on the robot, the rolling contact elements are for example situated in a plane GOz, the plane of symmetry of the robot (where G=the center of gravity of the robot and Oz=the axis of the post), and/or are symmetrically distributed relative to this plane of symmetry.

The robot grips the post using the bracing phenomenon which is closely linked to the relative position of the center of gravity G of the assembly {robot+payload} relative to the contact points and naturally also depends on the coefficient of friction of the contacts at the contact elements and on the inclination of the robot relative to the axis Oz. The bracing phenomenon which will be returned to below arises when G is sufficiently distant from the axis Oz of the post.

According to one embodiment of the invention, the center of gravity is situated at a motor-batteries assembly included in the motorized means; it may also be situated at the payload of the robot.

The bracing means advantageously comprise a turret, that can be oriented on an axis substantially at right angles to the post, on which a propulsion contact element is mounted. By changing the orientation of the turret, it becomes possible to have a helical ascending movement or even to orient the robot about the post at constant height.

They also preferably comprise at least one non-motorized rolling contact element also called a passive contact element and this (these) passive contact element(s) is (are) a connection or connections.

According to one feature of the invention, in order to allow conical posts to be ascended, the bracing means comprise, for at least one contact element, a clamping mechanism designed to keep all the contact elements clamped to the post.

This clamping mechanism comprises, for example, two adjustable rolling contact elements that can move relative to the frame and are mounted on rotary arms kept tight by springs. It is possible to add a coupling mechanism making the movements of the two arms symmetrical.

The contact element advantageously has a volume capable of being included between a plane T tangential to the post and a plane P parallel to T and passing through the axis Oz of the post.

According to another feature of the invention, the motorized movement means comprise a motor, a propulsion contact element, an orientable turret and a jaw clutch connected on the one hand to the motor and on the other hand to the propulsion contact element or to the orientable turret. This arrangement makes it possible to actuate either the propulsion of the robot, or the orientation of the turret with a single motor and can help to lighten the robot. The jaw clutch may if necessary be replaced by two antagonistic freewheel mechanisms making it possible, depending on the direction of rotation of the motor, to actuate the propulsion of the robot or the orientation of the turret.

According to one variant embodiment, they comprise a propulsion contact element, an orientable turret, a first motor connected to the propulsion contact element and a second motor connected to the orientable turret. The use of two motors allows greater reliability and additional maneuvers.

BRIEF DESCRIPTION OF THE DRAWINGS

Other features and advantages of the invention will appear on reading the following detailed description made as a non-limiting example and with reference to the appended drawings in which:

FIG. 5 represents the view of the transmission block, in its variant with jaw clutch, in perspective, FIG. 6 represent schematically an example of a climbing robot according to the invention with three contact elements, seen from above (FIG. 6a) and seen in perspective (FIG. 6b).

From one figure to another, the same elements are identified by the same reference numbers.

DETAILED DESCRIPTION

The invention relates to a robot for climbing along a post. "Post" means a vertical structure of the frustoconical or cylindrical type, with a substantially circular or polygonal cross section, capable of being gripped by the robot, partly or wholly. As a representative post, it is possible to cite an electricity or telephone pole, a lamp post, a water downpipe, etc.

The consumption of energy is greatly reduced compared with the systems of the prior art because only the ascending of the robot consumes energy. Once in position, the climbing robot no longer consumes energy which then becomes entirely available for the payload.

The position is held on the post without the consumption of energy by virtue of the bracing principle, that is to say by a jamming obtained when there is a frictional contact between the post and the contact points of the robot on the post. Jamming is obtained when the tangential force at the contact tends to increase the normal force, which then increases the tangential force until immobilization occurs.

The description is made with reference to the figures and the following list of items:

LIST OF ITEMS

Figure 1:
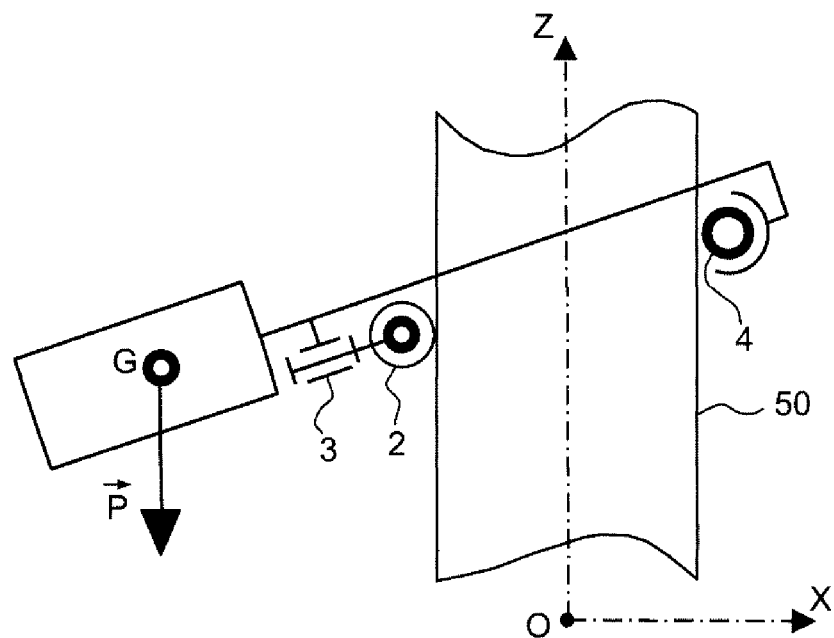
FIG. 1 represents schematically an example of a climbing robot with two contact elements according to the invention, in a side view, FIG. 1a reiterating FIG. 1 in order to illustrate the bracing phenomenon, FIG. 2 represent schematically an example of a climbing robot with three contact elements according to the invention, in side view (FIG. 2a) and from above (FIG. 2b)
Figure 1A:
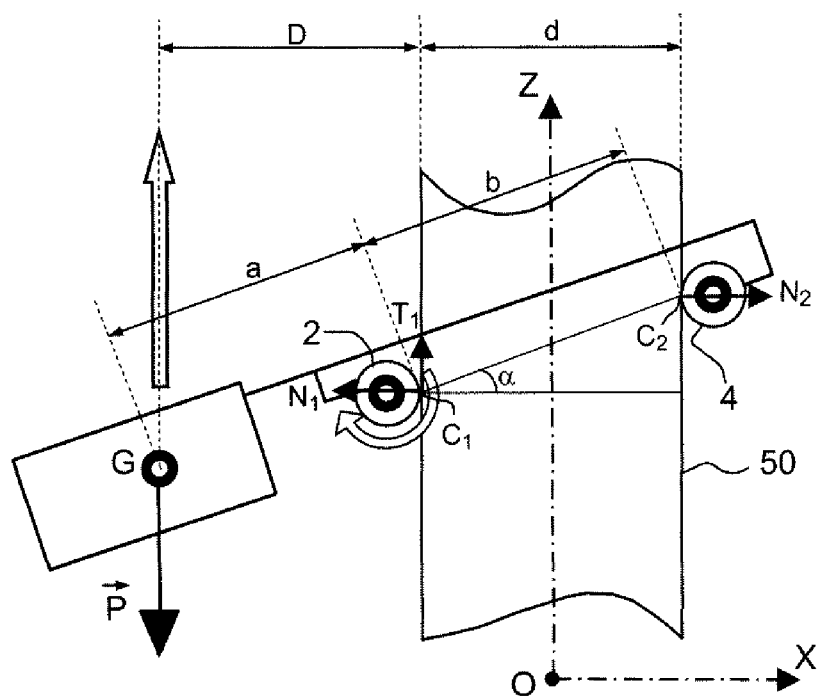

1 Frame
2 Motorized contact element: propulsion roller
3 Orientable turret
4 Passive contact element with swivel element
5 Moveable arm
6 Arm pivot
7 Rear lever of the arm
8 Reinforcement for a moveable arm
9 Pinhole for adjusting the opening of the arms
10 Control connecting rod
11 Sliding carriage
12 Carriage guidance tube
13 Moveable front support
14 Fixed rear support
15 Electric motor
16 Remote-control programmable controller (Bluetooth)
17 Control block (power card, batteries, etc.)
18 Jaw clutch
19 Gear reducer for propulsion of the roller
20 Gear reducer for orientation of the turret
21 Crown wheel
22 Freewheels
50 Cylindrical or conical post To keep it in position under the effect of the weight P, the robot is braced on at least two contact points as illustrated in FIGS. 1 and 1a. It is then stable and can remain coupled to the post 50 without the consumption of energy.

In order to allow the robot to ascend or descend while maintaining a very simple movement sequence, the contact points are provided by rolling contact elements such as the roller 2 at the swivel element 4. A rolling contact element designates a mechanical subassembly allowing the robot to bear against the post; it is a rolling solid such as a roller or a ball, in pivoting or swiveling connection with another body of the robot, etc.

These rolling contact elements are motorized in order to allow ascent or descent. The most pertinent choice consists in motorizing only one contact element, the one closest to the body of the robot, that is to say the roller 2. It is also possible to motorize the swivel element 4 but the transmission mechanism is more complex. The simultaneous motorization of the contact elements 2 and 4 requires that the two contact elements advance at the same speed.

Reference is made here to the concepts of bracing.

It is said that bracing occurs on a solid when the phenomenon of adhesion makes it impossible to move irrespective of the intensity of the external mechanical actions.

The robot according to the invention is based on bracing to keep it in position. In order to provide mobility in ascent, the contact points C1 and C2 are provided by the rolling contact elements 2 and 4. Figure 1a shows the robot fitted with two rollers. It is then possible to calculate the bracing condition of the robot on its contact elements.

Only the roller 2 is motorized. The contact C1 can therefore transmit both a normal force N1 and a tangential force T1. The roller 4 is free. The contact C2 transmits only a normal force N2. There is no tangential force.

Let us write down the condition for maintaining static equilibrium with the aid of the fundamental principle of statics:

Total forces along x:

$$N_1 = N_2 \qquad \text{(eq 1)}$$

Total forces along z:

$$T1 = mg \quad (eq\ 2)$$

Total moments along y (direction perpendicular to the plane of the figure) placed at the point C1:

$$amg\cos(\alpha) = b\,N2\sin(\alpha) \quad (eq\ 3),$$

a being the distance between the contact Cl of the roller 2 at the center of gravity G, b the distance between the two contacts C1 and C2 of the rollers 2 and 4, m the weight of the robot, g the acceleration of gravity.

By introducing the coefficient of friction p, the condition of not sliding at C1 is written:

$$T1 \leq \mu\,N1 \quad (eq\ 4)$$

(eq 2) and (eq 4) make it possible to rewrite the condition of not sliding:

$$N1 \geq mg/\mu \quad (eq\ 5)$$

(eq 1) and (eq 3) make it possible to obtain the expression for N1:

$$N1 = amg/[b\tan(\alpha)] \quad (eq\ 6)$$

(eq 5) and (eq 6) make it possible finally to obtain the condition of not sliding, ensuring bracing, that is to say allowing the robot to be held on the post without sliding irrespective of the intensity of the vertical external forces:

$$a \geq b\tan(\alpha)/\mu \text{ where } \alpha = \arccos(d/b) = \arccos(D/a) \quad (eq\ 7),$$

d being the diameter of the post, D the distance from the center of gravity G to the post.

It can be seen that this condition requires having an overhang a sufficiently long for bracing to occur. The more the adhesion increases (for large values of $\mu$) the shorter a can be. According to (eq 7), the less inclined the robot (for small values of $\alpha$) the more a decreases. Specifically, (eq 3) shows that the normal forces increase when $\alpha$ diminishes. In the case of a virtually horizontal robot, the normal forces tend toward infinity.

The condition of bracing (eq 7) depends only on the geometry and the coefficient of friction.

To give the robot a second ability to rotate about the post, the roller 2 is mounted on an orientable turret 3. This turret 3 can be oriented along an axis substantially normal to the post 50. Moreover, a connection simultaneously compatible with the ability to move up and to move in axial rotation about Oz, a spherical connection for example, is chosen for the contact element 4.

Figure 2A:
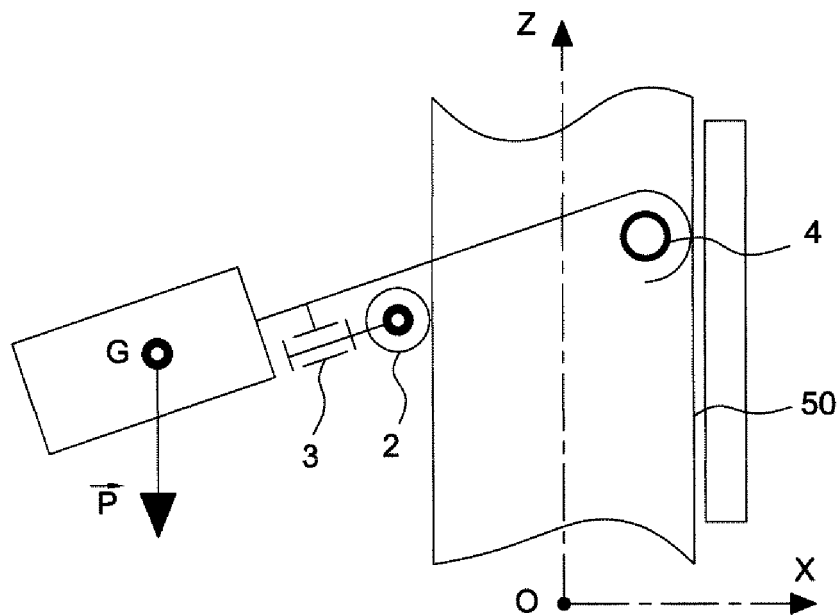
Figure 2B:
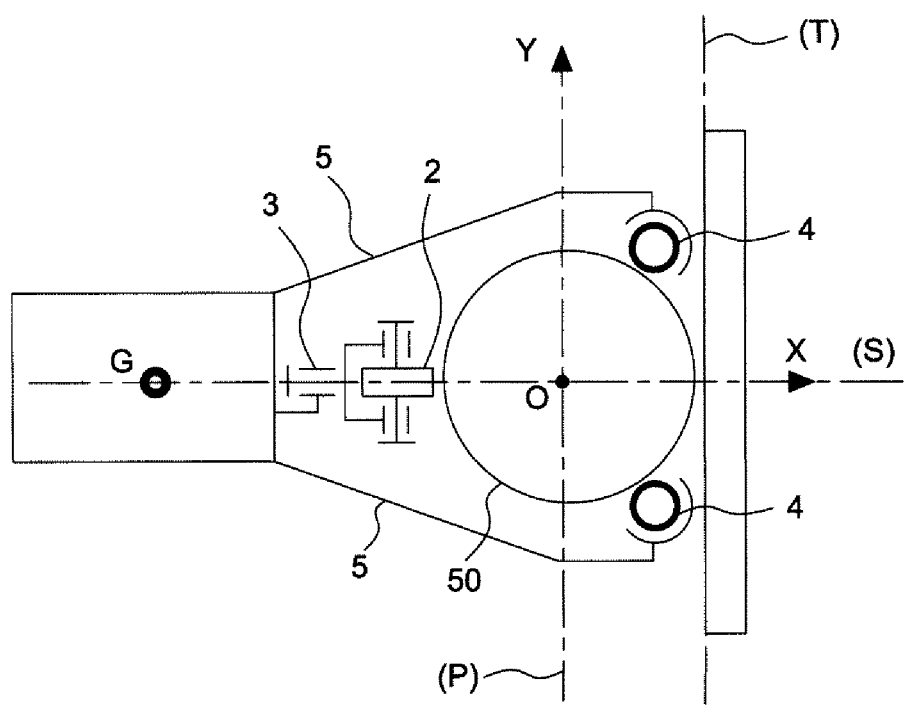

In order to improve the stability of the robot on the post 50 and to prevent a lateral tilting in rotation about the axis Gx, the points of contact of the robot on the post must be positioned symmetrically relative to the plane GOz, G being the center of gravity of the robot, Oz the axis of the post. This plane of symmetry of the robot is called S hereinafter. When only the contact element closest to G is motorized, it is possible to envisage various situations by going to the view of FIG. 2b, in projection along the axis Oz:

- 2 contact elements at 180°
- 3 contact elements at 120° (FIG. 2)
- 4 contact elements at 90°
- n contact elements at 360°/n, (n>1)

Hereinafter, chosen as a nonlimiting example of a climbing robot is a robot with three contact elements, which robot comprises one propulsion roller 2 and two passive (that is to say non-motorized) spherical connections 4. In order to allow the robot to avoid possible obstacles attached tangentially to the post, it is important to use very compact connections 4. "Compact connection" means a connection the volume of which is capable of being included between a plane T tangential to the post 50 (this plane T marking one of the border planes delimiting the obstacle) and a plane P parallel to T and passing through the axis Oz of the post; these planes T and P can be seen in FIG. 2b.

Figure 3:
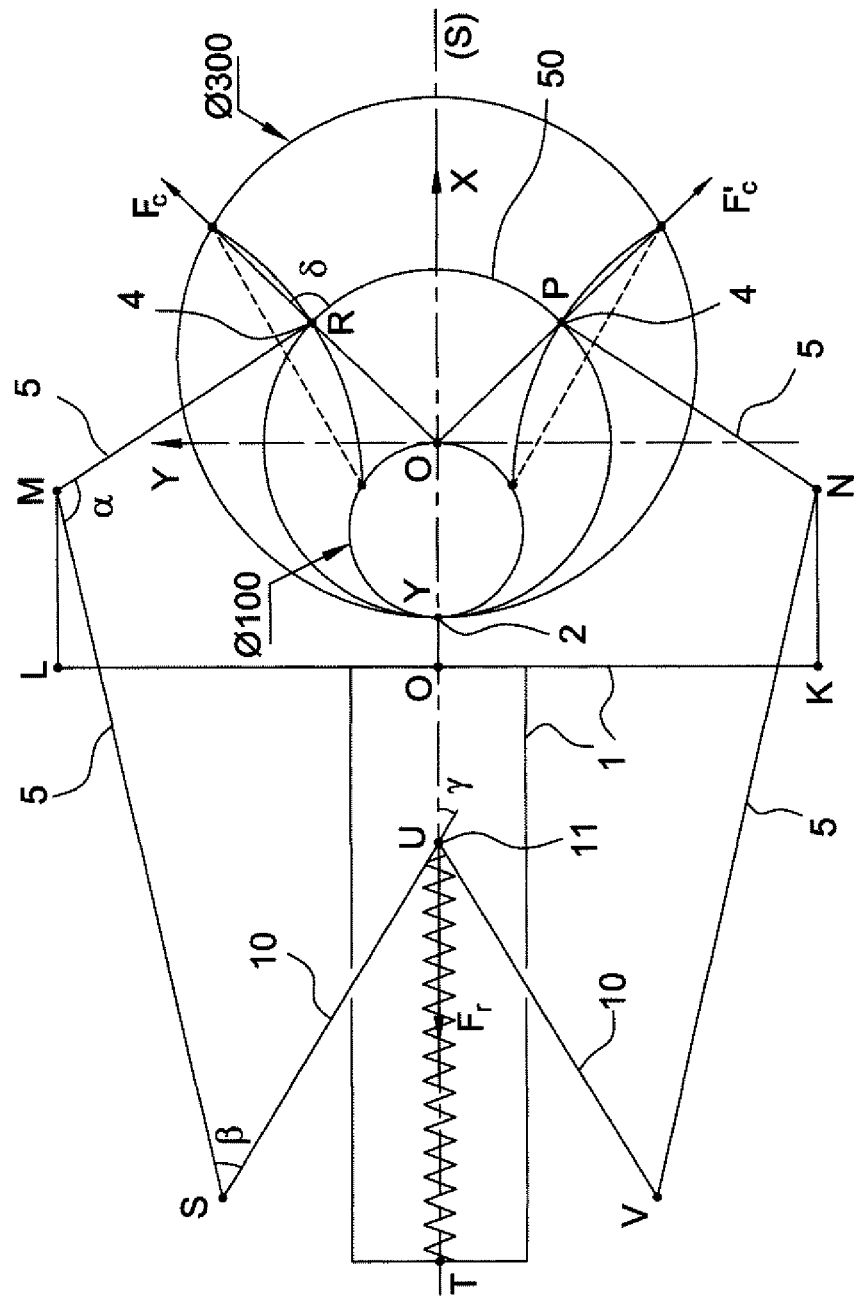
FIG. 3 represents the geometric schematization of a climbing robot with three contact elements according to the invention, with its characteristic dimensions for a post diameter that can vary between Dmin and Dmax, in a top view, FIG. 4 represent the view of the transmission block in its variant with two freewheels in perspective, as a whole (FIG. 4a) and in section (FIG. 4b)

In order to make the robot compatible with conical posts, it is provided with two moveable arms 5 which support the passive contact elements 4 and therefore make it possible to grip the post (FIG. 3). These arms are kept clamped on the post by means of a clamping mechanism actuated by powerful springs the force Fr of which can be seen in FIG. 3.

The frame 1 comprises the segments MLOKN and the support OT for the springs. The following tables show examples of dimensions of these segments and examples of ranges of diameters of posts.

| Dimension | Value (mm) |
|---|---|
| KL | 440 |
| LM | 103 |
| US | 240 |
| SM | 420 |
| MR | 177 |

| Range of diameters Dmin-Dmax (mm) | Angle α |
|---|---|
| 100-200 | 95° |
| 150-250 | 110° |
| 200-300 | 125° |

FIG. 3 shows three circles, the small one corresponding to the diameter Dmin, the large one corresponding to the diameter Dmax and the intermediate one corresponding to an intermediate diameter; for a given configuration, the robot climbs a post the diameter of which is between Dmin and Dmax. The points of contact of the passive contact elements 4 are at R and P on the intermediate circle, that of the motorized contact element 2 being situated at Y. In order to balance the forces of contact of the post on the robot, it is desired to distribute the three points of contact Y, R, P evenly at 120° intervals and to do so irrespective of the diameter of the post. For this purpose, a simple mechanism is proposed making it possible to move the points R and P simply by rotating the arms 5 SMR and VNP. In the example of FIG. 3, the two arms 5 comprise 2 segments, SM, MR and VN, NP, respectively. This mechanism therefore keeps the three points Y, R, P approximately at 120° intervals irrespective of the diameter of post 50. The forces of contact at R and P, marked Fc and F'c, therefore make an angle of pressure δ relative to the segments MR and NP, respectively. The angle δ is preferably close to 90° for the intermediate diameter of the post, in order to ensure good effectiveness.

The arms 5 are pushed by connecting rods 10 US and UV moved symmetrically by virtue of a carriage 11 represented by the point U sliding on the axis OT. γ marks the angle of pressure of the force Fr applied by the springs on the connecting rods 10 and β marks the angle of pressure of the force applied by the connecting rods 10 on the arms 5. Powerful tension springs, coupled to the frame at T, apply a return force Fr at the point U of the carriage, which tends to bring it closer to the point T. The use of springs makes it possible to avoid the use of an external energy for the clamping, the internal forces being considerable in the case of the bracing. When the arms 5 SMR and VNP clamp the post to the maximum, the connecting rods 10 are in a singular configuration (S, U and V in line) and the springs that are virtually relaxed do not need to provide strong forces for the robot to strongly clamp the post at R and P.

Since no spring can lengthen sufficiently while applying the intense forces necessary at P and R, three adjustments of the arms 5 of the robot are proposed making it possible to climb posts in the diameter ranges indicated in the table above. In order to pass from one configuration to the other, the triangulation of the arms is changed, that is to say the angle a between SM and MR, and VN and NP respectively, by means of adjusting pins 9 that can be seen in FIG. 6. This angle a is adjusted once and for all before the ascent of a conical post, as a function of its diameters Dmin and Dmax.

The chassis is for example made of a very rigid welded aluminum tube.

The motorization aspect of the robot will now be addressed.

In FIG. 4, the climbing robot is motorized by a main motor 15 which, depending on its direction of rotation, drives either the propulsion contact element 2, that is to say the ascending roller, or the orientation turret 3 (these elements are not repeated in FIG. 4b): such a transmission block is shown in FIG. 4. The use of two freewheels 22 makes it possible to pick up the corresponding movement.

According to one variant shown in FIG. 5, the climbing robot is motorized by a main motor 15 followed by a jaw-clutch system actuated by a miniature motor, not shown in the figure. The jaw clutch 18 replaces the freewheels. Depending on the position of the jaw clutch, a switch is made between a "roller rotation" mode and a "turret orientation" mode.

A second variant is envisaged which makes it possible to improve the efficiency and the mechanical simplicity. The motorization is then provided by two separate motors: a large motor for rotating the roller 2, a smaller motor for the orientation of the turret 3.

The center of gravity G can be situated in the motor-batteries assembly or in the payload.

An example of an assembled climbing robot will now be described with reference to FIG. 6.

The assembled robot incorporates the chassis, the transmission block and a control module 17.

Figure 6A:
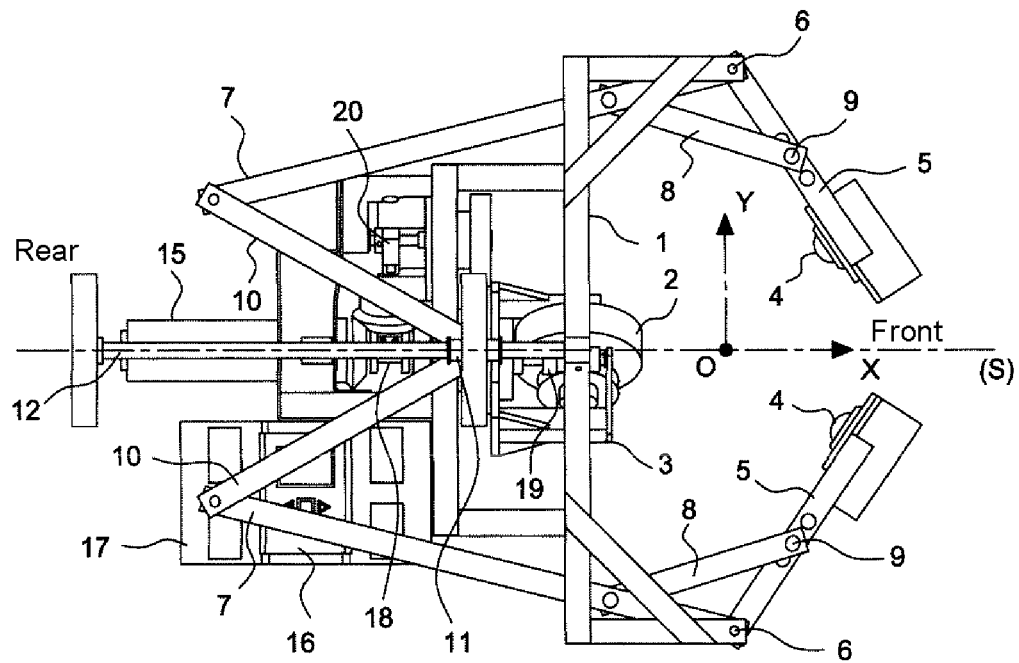
Figure 6B:
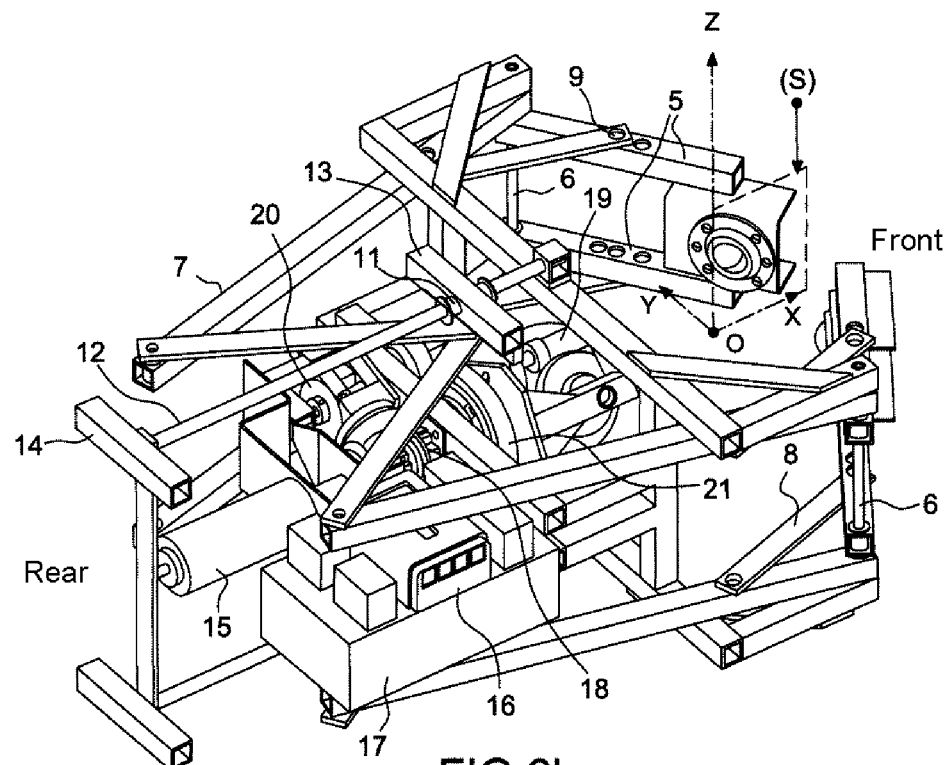

FIG. 6 show an assembled climbing robot. It comprises a rigid frame, for example made of welded aluminum tubes, which supports the propulsion roller 2 mounted on an orientated turret 3. This roller constitutes the rear point of contact of the robot with the post 50 not shown in these figures. The two front points of contact are provided by two passive contact elements, in this instance non-motorized swivel elements 4, each of these swivel elements being attached to a moveable arm 5. It can be seen in FIG. 6b that, in this particular version of the robot, each arm 5 has been duplicated in an upper plane and a lower plane to the body of the robot (these planes are parallel to the plane Oxy), which prevents any collision with the motorization block.

Each arm 5 is mounted on a pivot 6 and comprises a rear lever 7, secured to the arm by means of a reinforcement 8. Three pinholes 9 allow three different positions for assembling the reinforcement 8 on the arm, which makes it possible to adjust the characteristic angle a of the arm and therefore to adapt to various diameters of post.

The arms 5 are kept clamped around the post by means of connecting rods 10 attached on the one hand to the rear lever 7 of each arm 5 and on the other hand to the carriage 11 which slides along the guidance tube 12. Sixteen tension springs with great elongation (not shown in the figure) tend to draw the carriage 11 toward the rear of the robot and therefore to clamp the arms 5 around the post. These springs are attached on the one hand to a moveable front support 13 secured to the carriage 11 and on the other hand to a fixed rear support 14 connected to the frame 1 by means of the tube 12.

According to one variant embodiment, it is possible to replace the tension springs with compression springs which are attached on the one hand to the sliding carriage 11 and on the other hand to the frame close to the turret, and which also have the function of subjecting the carriage to a force tending to cause the carriage 11 to move rearward. These springs can be replaced by any other equivalent means.

The rear of the frame 1 supports an electric motor 15 which is actuated by means of a programmable controller 16 and a control block 17 comprising a power card and batteries. The motor and the batteries are heavy components intentionally positioned a long way from the axis Oz of the post in order to move the center of gravity G away and thus ensure good attachment of the robot by bracing. The motor actuates, by means of a jaw-clutch system 18, either a gear reducer 19 which drives the propulsion roller 2, or a second gear reducer 20 which drives the crown wheel 21 secured to the orientable turret 3. The functions of propulsion and orientation of the roller are therefore obtained with a single motor and a jaw clutch. It is also possible to imagine omitting the jaw clutch 18 and adding a second motor assigned exclusively to the orientation of the roller 2 as indicated above.

Such a climbing robot has been produced. It has the following main features.

The total weight is less than 8 kg and the folded dimensions remain within the following template: 50 cm×50 cm×50 cm.

It carries a payload of 1 kilogram in a dedicated carrying space consisting of a cube of 10 cm×10 cm×10 cm.

The maximum ascent and descent speed is at least 50 mm/s.

The vertical structures that can be exploited are elements of the frustoconical type with a diameter of between 30 cm and 10 cm. Operation on octagonal structures is possible.

It is capable of passing over bands encircling the post and generating an extra thickness of 5 mm on its surface.

The invention claimed is:

1. A climbing robot that can move along a post having a vertical axis Oz, comprising: a frame fitted with a motorized movement means for moving along the post and with a module for controlling and commanding the motorized movement means, wherein the motorized movement means further comprises bracing means of which the center of gravity G is at a distance from the axis Oz of the post and which comprises at least two rolling contact elements designed to be in contact with the post, including at least one motorized rolling contact element being a propulsion contact element, said propulsion contact element having a friction contact with the post, at a distance from G, the robot being at an inclination relative to the axis Oz, and a coefficient of friction of the propulsion contact element and the inclination of the robot relative to the axis Oz being linked together so as to ensure that the robot is kept in a fixed position without consumption of energy, including means for orienting the robot rotationally about the vertical axis Oz.

2. The climbing robot as claimed in claim 1, wherein the propulsion contact element comprises a roller, and wherein the roller is mounted on a turret rotationally orientable about an axis substantially perpendicular to the post vertical axis Oz, thereby enabling the robot to be rotated and oriented about said post vertical axis Oz.

3. The climbing robot as claimed in claim 2, wherein the motorized movement means further comprises a motor, a propulsion contact element, the orientable turret and a jaw clutch connected on the one hand to the motor and on the other hand to the propulsion contact element or to the orientable turret.

4. The climbing robot as claimed in claim 2, wherein the motorized movement means further comprises a propulsion contact element the orientable turret, a first motor connected to the propulsion contact element and a second motor connected to the orientable turret.

5. The climbing robot as claimed in claim 1, wherein the motorized rolling contact element or elements are the rolling contact element or elements closest to the center of gravity G.

6. The climbing robot as claimed in claim 1, wherein the rolling contact elements are situated in a plane of symmetry S of the robot passing through the axis Oz of the post and the center of gravity G and/or are symmetrically distributed relative to said plane of symmetry S.

7. The climbing robot as claimed in claim 6, further comprising three rolling contact elements including one propulsion contact element situated in the plane of symmetry S and two passive contact elements, the three contact elements being designed to be substantially distributed at 120° intervals around the post.

8. The climbing robot as claimed in claim 1, wherein the bracing means further comprises at least one non-motorized rolling contact element also called a passive contact element.

9. The climbing robot as claimed in claim 8, wherein the passive contact element is a spherical swivel element.

10. The climbing robot as claimed in claim 1, wherein the rolling contact element has a volume capable of being included between a plane T tangential to the post and a plane P parallel to T and passing through the axis Oz of the post.

11. The climbing robot as claimed in claim 1, wherein the bracing means comprises, for at least one contact element, a clamping mechanism designed to keep the element clamped to the post.

12. The climbing robot as claimed in claim 11, wherein the clamping mechanism further comprises at least one spring and, for each contact element capable of being clamped, a moveable arm which supports said contact element and is connected to the spring.

13. The climbing robot as claimed in claim 12, wherein the moveable arm is actuated by a connecting-rod mechanism, a sliding carriage and a moveable front support.

14. The climbing robot as claimed in claim 12, wherein the arm further comprises a segment in contact with the post and in that the clamping force applied by the arm is virtually perpendicular to said segment in all the clamping positions.

15. The climbing robot as claimed in claim 11, wherein the post is a conical structure.

16. The climbing robot as claimed in claim 1, wherein the post is a cylindrical structure.

17. The climbing robot as claimed in claim 1, wherein the post has a substantially circular or polygonal cross section.

18. The climbing robot as claimed in claim 1, wherein the robot is capable of helical ascending movement.

19. The climbing robot as claimed in claim 1, wherein the robot is capable of being rotationally oriented about the post vertical axis Oz at constant height.

* * * * *